United States Patent [19]

Yunker et al.

[11] Patent Number: 5,042,767

[45] Date of Patent: Aug. 27, 1991

[54] APPARATUS AND METHOD FOR CONTROLLING CABLE WASTE MATERIALS

[76] Inventors: John F. Yunker, 1309 Briarhaven Dr., Bedford, Tex. 76021; Luke F. Witgen, 190 Bent Tree, Nicholasville, Ky. 40356

[21] Appl. No.: 395,230

[22] Filed: Aug. 17, 1989

[51] Int. Cl.⁵ .............................................. F16M 11/01
[52] U.S. Cl. ................................ 248/201; 248/205.1; 29/446
[58] Field of Search ............... 248/201, 205, 214, 231, 248/286, 287, 295.1, 297.2, 61; 29/446

[56] References Cited

U.S. PATENT DOCUMENTS

| | | | |
|---|---|---|---|
| 1,185,525 | 5/1916 | Morris | 248/205.1 X |
| 3,115,213 | 12/1963 | Cloutier | 248/231 X |
| 3,215,387 | 11/1965 | Thompson et al. | 248/201 X |
| 4,265,422 | 5/1981 | Van Leeuwen | 248/231 X |

Primary Examiner—Ramon O. Ramirez
Attorney, Agent, or Firm—John A. Odozynski

[57] ABSTRACT

A pair of support members which clamp to an aerial cable and hold a tarp beneath the cable is disclosed. Since the support members couple to one another only through the tarp, they may be positioned at any distance from one another on the cable. The support members tightly clamp to the cable through a lashing strap and buckle arrangement. Each of the support members includes first and second spreader arms, which clamp to the tarp and position the edges of the tarp horizontally away from the cable. The support members hold the tarp in a "V" shape with the distance between the cable and the bottom of the "V" shape being adjustable through an axle assembly. Moreover, the axle assembly permits adjustment of spreader arm angles to vary the horizontal positioning of tarp edges. These numerous adjustable features permit the apparatus to be oriented for a wide variety of single and multiple cable configurations.

34 Claims, 2 Drawing Sheets

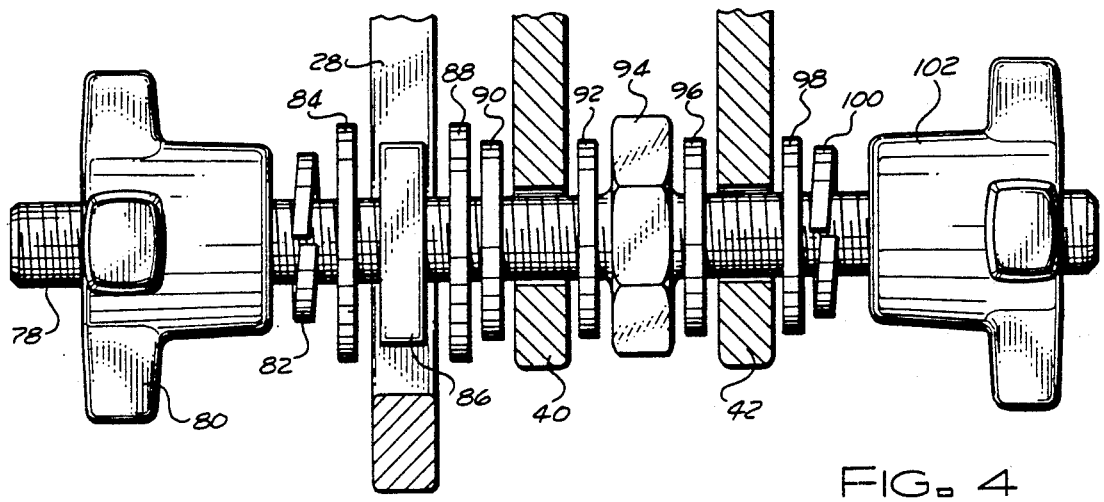
FIG. 4
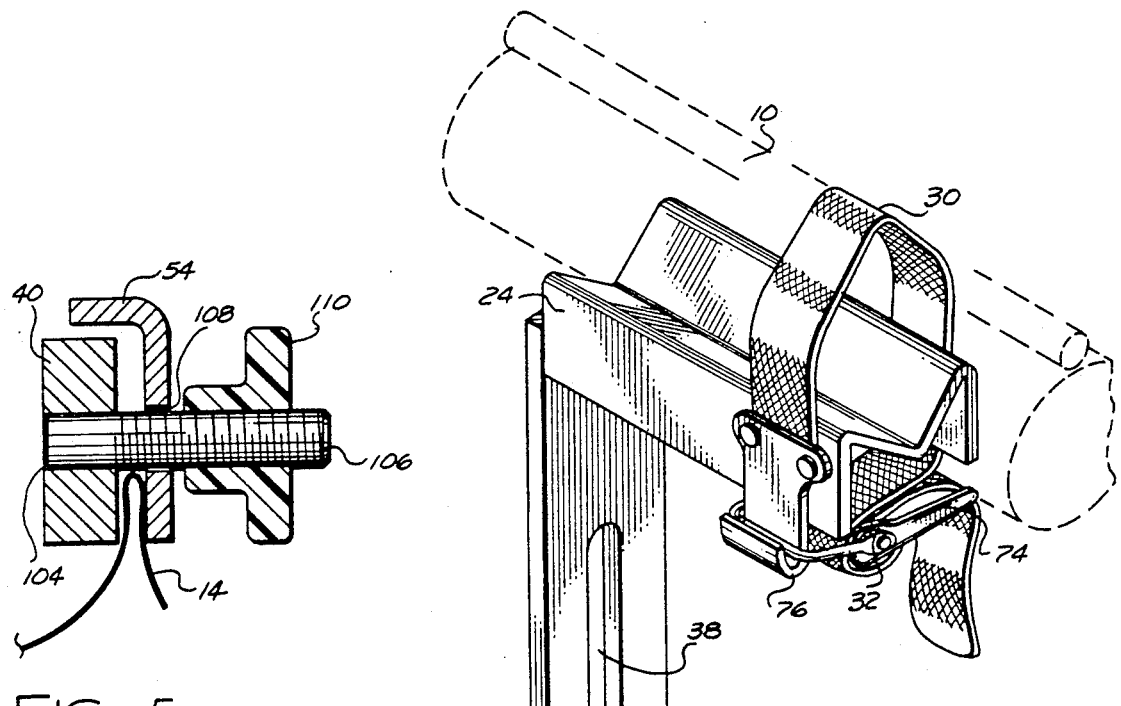
FIG. 5
FIG. 3

5,042,767

APPARATUS AND METHOD FOR CONTROLLING CABLE WASTE MATERIALS

TECHNICAL FIELD OF THE INVENTION

The present invention relates generally to the telecommunications and related industries and to devices used in splicing and maintaining cables. More specifically, the present invention relates to devices which capture and retain filling compound and other waste materials which result from splicing or other cable maintenance procedures.

BACKGROUND OF THE INVENTION

The telecommunications industry currently installs filled cables in aerial applications. These filled cables typically include a multiplicity of individual conductors. In addition, a filled cable includes a filling compound which saturates the cable's core, surrounding the individual cable conductors. Extended thermo-plastic rubber (ETPR) represents one common example of such a filling compound, but other examples, such as a compound known by the acronym PEPJ, are used as well. The filling compound is a chemically inert substance which serves a valuable role in excluding moisture from the cable to reduce cable deterioration, lengthen cable life, diminish interruption of telecommunications services, and minimize maintenance.

However, a filled cable additionally exhibits undesirable characteristics due to the use of a filling compound. For example, the filling compound is a solid, but exceedingly slippery, material. So long as a cable remains undisturbed, the filling compound does not fall from the cable core at a cable opening. However, when a cable is terminated, when two cables are spliced together, or when a cable is spliced to repair damage, the filling compound tends to flake-off the individual conductors of the cable due to handling of the individual conductors. Cable technicians and the general public face a potentially hazardous condition when the filling compound falls on ladder rungs, platforms, manhole floors, sidewalks, or other surfaces. In addition, the filling compound may settle on underlying cars, shrubs, fences, and the like to pose a clean-up problem for persons splicing or terminating a cable.

Consequently, a device and procedure for preventing this hazard and clean-up problem are needed. One undesirably expensive prior art device which addresses this need employs a collapsible, integrated unit which suspends a tray having a disposable liner beneath a cable being spliced. Filling compound and other cable waste materials then fall harmlessly into the tray for later collection and disposal. While this approach tends to suitably catch and retain the waste materials, it is too large and too inflexible in positioning the device around a cable for successful deployment in the field.

Specifically, the integrated unit approach of this prior art device causes it to be undesirably bulky so that it is difficult to transport to a work site and difficult to attach to an aerial cable. Moreover, this prior art device allows no horizontal and vertical adjustments relative to a cable on which it is installed. Often, multiple cables are suspended in close proximity to one another. A cable to be spliced may be located over, under, beside, or between other closely spaced apart cables. The lack of adjustments and the device's bulky size prevent the device from being usable in many of such situations.

SUMMARY OF THE INVENTION

Accordingly, it is an advantage of the present invention that an improved apparatus for controlling cable waste materials is provided.

Another advantage of the present invention is that a device which employs separate, discrete cooperative components is provided so that the present invention is easily transported and coupled to an aerial cable.

Yet another advantage is that the present invention accommodates a wide variety of adjustments to permit its use in a wide variety of cable configurations.

Still another advantage is that the present invention provides a method for controlling cable waste materials.

The above and other advantages of the present invention are carried out in one form by an apparatus which attaches to a cable and which supports a flexible sheet beneath the cable to catch waste materials falling from the cable. The apparatus includes a riser which is designed for generally perpendicular orientation relative to the cable. The riser may be viewed as having first and second ends. A first clamping device couples to the riser near the first end of the riser and serves to clamp the riser to the cable. The apparatus additionally includes first and second spreader arms. Each of the spreader arms may be viewed as having first and second ends. The first ends of the spreader arms couple to the riser between the riser's first and second ends. The first spreader arm extends away from the riser at an angle in a first direction, and the second spreader arm extends away from the riser at an angle in a second direction, wherein the first and second directions oppose one another. Second and third clamping devices couple to the first and second spreader arms, respectively. The second and third clamping devices serve to releasably hold the flexible sheet.

BRIEF DESCRIPTION OF THE DRAWINGS

A more complete understanding of the present invention may be derived by referring to the detailed description and claims when considered in connection with the FIGURES, wherein like reference numbers refer to similar items throughout the FIGURES, and:

FIG. 3 shows a second projection view of one of the support members of the present invention;

FIG. 4 shows a side view of an axle assembly portion of the present invention; and FIG. 5 shows a cross sectional view of a portion of the present invention which includes a spreader arm and a clamp.

DETAILED DESCRIPTION OF THE PREFERRED EMBODIMENT

Figure 1:
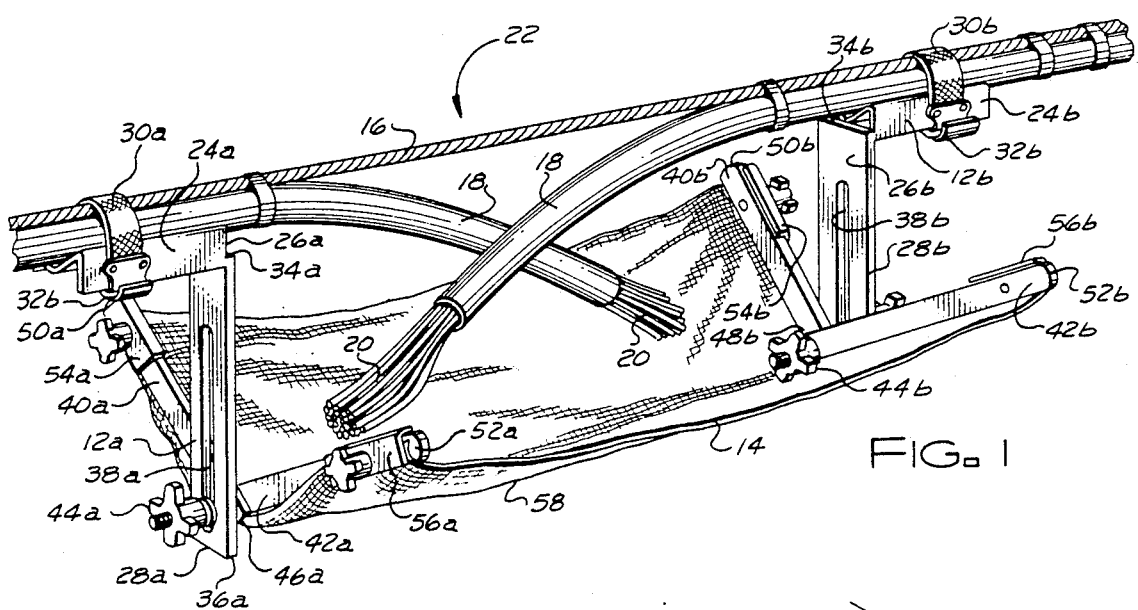
FIG. 1 shows a projection view of two support members constructed in accordance with the present invention and coupled to a cable and a flexible sheet.

FIG. 1 illustrates the cooperation between a cable assembly 10, a left support member 12a, a right support member 12b, and a flexible sheet or tarp 14 to control cable waste materials. In the preferred embodiment, cable assembly 10 includes a strand 16 to which an electrical cable 18, having a multiplicity of individually insulated wires 20, is lashed using a conventional lashing technique. As shown in FIG. 1, cable 18 has two ends which reside in a splicing area 22, which represents the general region of cable assembly 10 in which a splicing operation is to take place.

Left support member 12a and right support member 12b clamp to cable assembly 10, spaced apart from one another, on opposing sides of splicing area 22. Support members 12a and 12b are generally identical to each other and are oriented on cable assembly 10 to face each other. Since support members 12a and 12b are generally identical to one another, subsequent discussion herein of support members 12a and 12b and the constituent components of support members 12a and 12b may omit the "a" or "b" reference suffix to refer to a like feature of either support member 12a or support member 12b, or to more than one of such like features collectively.

Each of support members 12 includes a saddle member 24. As shown in FIG. 1, saddle members 24 reside immediately adjacent to, parallel with, and beneath cable assembly 10. In the preferred embodiment, saddle members 24 are each approximately 3-4 inches in length. An inside end 26 of saddle 24 refers to the end of saddle 24 which faces splicing area 22. At inside end 26, saddle 24 couples to a riser 28, which in FIG. 1 extends vertically downward from cable assembly 10. A lashing strap 30 couples to saddle 24 and operates with saddle 24 to surround cable assembly 10. Lashing strap 30 includes a tensioning device 32, which causes saddle 24 to be tightly clamped to cable assembly 10. Thus, although FIG. 1 shows support members 12 extending vertically downward beneath cable assembly 10, the tight clamping of support members 12 to cable assembly 10 permits support members 12 to extend horizontally, vertically upward, or in any other orientation out from cable assembly 10.

The distance between support members 12a and 12b is not critical in the present invention and is readily adjustable since support members 12a and 12b clamp to cable assembly 10 independently from one another. A cable technician installing support members 12 may therefore position support members 12 on cable assembly 10 so they do not interfere with splicing procedures to be conducted in splicing area 22 or with ladder supports (not shown) which may additionally couple to cable assembly 10. Moreover, although the vertically downward placement of support members 12 is the preferred placement of support members 12, they may alternatively be positioned in any vertical or horizontal position on cable assembly 10 to compensate for other cables near cable assembly 10 or for other obstructions.

Riser 28 is an elongated plate that has a first end 34, which rigidly attaches to inside end 26 of saddle 24, and a second end 36, which opposes first end 34. In the preferred embodiment, riser 28 is around 7-9 inches in length and couples to saddle 24 at a substantially perpendicular angle. Consequently, riser 28 extends perpendicularly away from cable assembly 10. Riser 28 includes a longitudinally extending, elongated opening 38 centrally located therein. Opening 38 resides intermediate to first and second ends 34 and 36.

Spreader arms 40 and 42 couple through an axle assembly 44 to riser 28 at opening 38. Specifically, spreader arms 40 and 42 have first ends 46 and 48 and second ends 50 and 52, respectively. In the preferred embodiment, spreader arms 40 and 42 are identically formed elongated members approximately 10-14 inches long. First ends 46 and 48 rotatably couple to axle assembly 44 and second ends 50 and 52 oppose first ends 46 and 48, respectively. The distance at which axle assembly 44 and spreader arms 40 and 42 reside away from cable assembly 10 is slidably positionable within opening 38. Moreover, spreader arms 40 and 42 may be rotated relative to riser 28 so that spreader arms 40 and 42 may be positioned at desired angles relative to riser 28 and to each other. As shown in FIG. 1, spreader arm 40 angles away from riser 28 in a first direction, and spreader arm 42 angles away from riser 28 in a second direction, wherein the first and second directions are on opposite sides of riser 28 and cable assembly 10.

Clamps 54 and 56 reside near second ends 50 and 52 on spreader arms 40 and 42, respectively. Clamps 54 securely but releasably hold tarp 14 so that tarp 14 resides beneath splicing area 22. As shown in FIG. 1, tarp 14 exhibits a "V" cross sectionally shaped orientation when coupled to support members 12a and 12b. A point 58 of this cross sectional "V" shape is the vertically lowest point of tarp 14 and is horizontally positioned directly beneath splice area 22.

Conventional splicing procedures may commence with tarp 14 positioned beneath splicing area 22. During such splicing procedures, filling compound and other waste materials, such as shielding and insulating jackets, fall from cable 18 onto tarp 14 and are retained in tarp 14 due to the "V" shape in which tarp 14 is held by support members 12. Moreover, the sides of the "V" shape orientation of tarp 14 serve as a wind break which protects the waste contents in tarp 14 from being spilled by wind or other minor disturbances.

Tarp 14 may be formed from plastic, polyethylene, canvas, fiber reinforced plastic, fabric, or the like. An inexpensive and disposable material, such as plastic, is preferred so that waste materials retained in tarp 14 may be rolled up into a package within tarp 14 and disposed with tarp 14. However, in unusually windy situations or when unusually large splicing jobs are anticipated, a relatively more expensive and stronger flexible sheet, such as canvas or fiber reinforced plastic, may be used for increased strength. When the more expensive flexible sheet is utilized, a less expensive flexible sheet, such as plastic, may advantageously be used in conjunction with the more expensive sheet as a disposable insert so that tarp 14 then represents the combination of two flexible sheets.

The size and shape of tarp 14 are not critical parameters in the present invention. However, tarp 14 preferably exhibits a square or rectangular shape which is not significantly larger than needed to attach to support members 12. Such a size and shape eases the attachment of tarp 14 to support members 12 and minimizes the interference of tarp 14 with splicing procedures. As discussed above, the distance between support members 12 is adjustable. Hence, tarp 14 is at least as long as the selected distance between support members 12. In addition, tarp 14 is at least as wide as the horizontal distance between second ends 50 and 52 of spreader arms 40 and 42, respectively, as selectably positioned on axle assembly 44. Of course, those skilled in the art will recognize that suitably sized plastic sheets may be cut prior to use at a particular job or that multiple canvas tarps may be lashed together to form a suitably dimensioned tarp 14.

Figure 2:
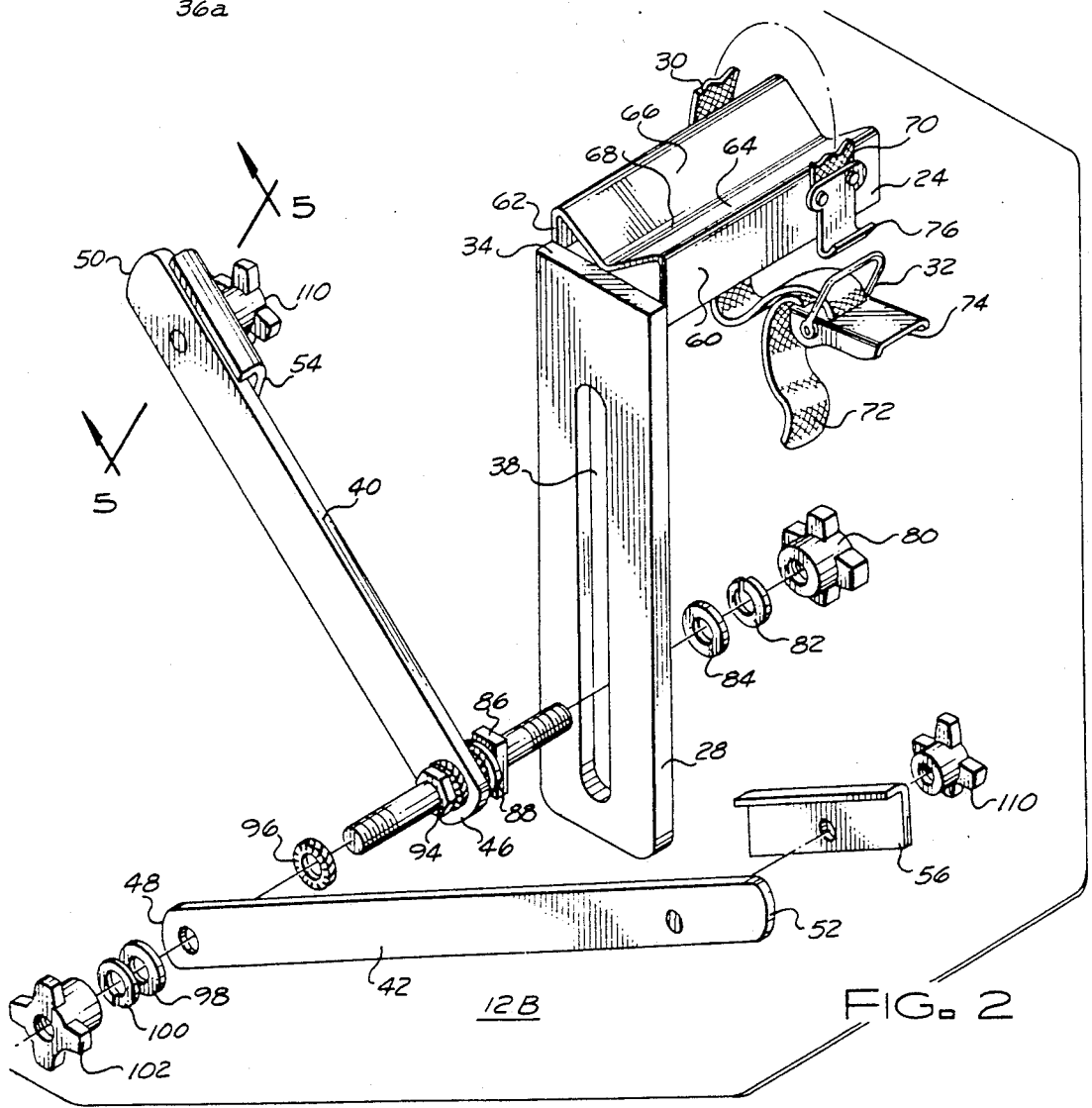
FIG. 2 shows a first projection view of one of the support members of the present invention.

FIG. 2 shows a first projection view of right support member 12b. FIG. 2 illustrates that saddle 24 is welded to riser 28 in the preferred embodiment. Specifically, saddle 24 includes front and rear vertical plates (as viewed in FIG. 2) 60 and 62, respectively, which each extend above (as viewed in FIG. 2) first end 34 of riser 28. In addition, saddle 24 includes front and rear inclined plates 64 and 66, respectively. Inclined plates 64 and 66 rigidly attach, and may be integrally formed with, vertical plates 60 and 62, respectively, at upward edges (as viewed in FIG. 2) thereof. Inclined plates 64 and 66 each incline downward (as viewed in FIG. 2) and inward to approximately first end 34 of riser 28. As a result, a groove 68 forms between inclined plates 64 and 66.

Groove 68 positively positions cable assembly 10 (see FIGS. 1-3) relative to saddle 24 to enhance the tight, non-slipping, immovable clamping of support member 12 to cable assembly 10. In addition, inclined plates 64 and 66 may advantageously exhibit non-slip exterior surfaces to further aid the immovable positioning of support member 12 on cable assembly 10.

With reference to FIGS. 2-3, lashing strap 30 has a first end 70 which attaches to front vertical plate 60 of saddle 24. A second end 72 of lashing strap 30 adjustably couples to tensioning device 32. As illustrated in FIGS. 2-3, the preferred embodiment utilizes a conventional buckle-type of a lever-actuated tensioning device which snaps into place when a lever 74 thereof rotates past a lever axis. However, those skilled in the art will recognize that alternate tensioning devices may be adapted for use in the present invention.

Tensioning device 32 removes slack from lashing strap 30 so that support member 12 tightly clamps to cable assembly 10. However, tensioning device 32 has only a limited authority in removing such slack. Consequently, the precise location of tensioning device 32 on lashing strap 30 is adjustable so that support member 12 may clamp to a wide variety of cable assembly diameters.

A hook 76 rigidly couples to front vertical plate 60 of saddle 24 for cooperative operation with tensioning device 32. To install support member 12, a cable technician typically positions tensioning device 32 on lashing strap 30, and support member 12 at a desired location next to cable assembly 10 (see FIG. 1). Next, the technician routes lashing strap 30 around cable assembly 10 and hooks tensioning device 32 over hook 76. The positioning of tensioning device 32 on lashing strap 30 produces an amount of slack in lashing strap 30 that is within the authority of tensioning device 32. Next, the cable technician actuates a lever 74 of tensioning device 32 to remove the remaining slack from lashing strap 30 and tightly clamp support member 12 to cable assembly 10.

Although left and right support members 12a and 12b (see FIG. 1) are generally identical to one another, the attachment of first end 70 of lashing strap 30 and hook 76 may advantageously be reversed on rear vertical plate 62 and front vertical plate 60, respectively, between left and right support members 12a and 12b. Thus, when a cable technician is positioned on one side of cable assembly 10 (see FIG. 1), support members 12a and 12b may face each other with tensioning devices 32 and hooks 76 on the technician's side of cable assembly 10. Such common location eases the attachment and adjustment of support members 12 on cable assembly 10.

The side view of axle assembly 44a depicted in FIG. 4 best illustrates the specific coupling of spreader arms 40 and 42 to riser 28. As shown in FIG. 4, axle assembly 44 includes a threaded axle 78 upon which several components are mounted. Specifically, starting from the outside and moving to the inside, or from left to right as viewed in FIG. 4, an outside hand-operated knob 80 threadably couples to threaded axle 78. Next, a lock washer 82 and a flat washer 84 are placed on threaded axle 78. After flat washer 84, threaded axle 78 passes through opening 38 (see FIGS. 1-3) in riser 28, as discussed above. To the inside of flat washer 84, as viewed in FIG. 4, a rectangular block 86 immovably couples to threaded axle 78 so that block 86 rides within opening 38, as shown in FIG. 3. To the inside of riser 28, a flat washer 88 followed by a star washer 90 reside on threaded axle 78. Spreader arm 40, at an opening therein couples to threaded axle 78 to the inside of star washer 90, and a star washer 92 is positioned on threaded axle 78 to the inside of spreader arm 40.

Inside of star washer 92, a locked nut 94 is immovably positioned on threaded axle 78. Locked nut 94 is immovably positioned through the use of a suitable adhesive, welding, or other conventional technique. A star washer 96 resides on threaded axle 78 inside of locked nut 94, and spreader arm 42, at an opening therein couples to threaded axle 78 to the right of star washer 96. A flat washer 98 is positioned inside of spreader arm 42, and a lock washer 100 is positioned inside of flat washer 98 on threaded axle 78. Finally, a hand-operated knob 102 threadably couples to threaded axle 78 inside of lock washer 100 and at the inside and of axle assembly 44, or at the right side of axle assembly 44a as viewed in FIG. 4.

With reference to FIGS. 1-4, the distance between cable assembly 10 and axle assembly 44 is adjusted by loosening outside knob 80, and placing axle assembly 44 at a desired location. The loosening of outside knob 80 simultaneously permits rotation of spreader arm 40 for adjustment of the angle between spreader arm 40 and riser 28. When axle assembly 44 and spreader arm 40 have been positioned at desired locations, outside knob 80 may then be tightened to clamp both riser 28 and spreader arm 40 to axle assembly 44 between outside knob 80 and locked nut 94.

Likewise, the angle between spreader arm 42 and riser 28 may be adjusted by loosening inside knob 102. This loosening of inside knob 102 releases clamping pressure on spreader arm 42 so that it may be rotated to a desired angle. When spreader arm 42 has been positioned at a desirable angle, inside knob 102 may then be tightened to clamp spreader arm 42 to axle assembly 44 between inside knob 102 and locked nut 94.

During the loosening and tightening of knobs 80 and 102, rectangular block 86 (see FIGS. 2-4) abuts a wall of opening 38 to prevent rotation of threaded axle 78. Thus, a cable technician may operate knobs 80 and 102 using only one hand. Moreover, the inside-most and outside-most threads of threaded axle 78 may be disturbed, by application of a suitable adhesive, mechanical deformation, or the like, so that once knobs 80 and 102 have been installed thereon, they cannot be removed from threaded axle 78. This disturbance prevents knobs 80 and 102 from being inadvertently dropped from support member 12 when loosened.

FIGS. 1 and 4 illustrate an additional function performed by axle assembly 44. Axle assembly 44 projects away from riser 28 in a direction substantially parallel to cable assembly 10. Moreover, since support members 12 face each other on cable assembly 10, axle assembly 44 projects inward farther than it projects outward. In other words, since spreader arms 40 and 42 reside inside of riser 28, the larger portion of axle assembly 44 projects inward. Thus, this inside projecting portion of axle assembly 44 serves as an anchor for tarp 14. Specifically, tarp 14 is routed beneath axle assembly 44 to define the location of point 58, discussed above. Consequently, tarp 14 remains held in the "V" configuration regardless of wind or other minor disturbances.

FIG. 5 shows a cross sectional view of spreader arm 40 taken along line 5—5 in FIG. 2. Thus, FIG. 5 illustrates details related to clamp 54. Since clamp 56 is substantially identical to clamp 54, such details relate equally to clamp 56. An opening 104 in spreader arm 40 contains a press-fit stud 106 which projects outward from spreader arm 40 away from splice area 22 (see FIG. 1). Clamp 54 is an L-shaped plate which has an opening 108 centrally located in the large portion of the L shape. Stud 106 extends through opening 108, and the small portion of the L shape resides alongside an edge of spreader arm 40. A hand-operated knob 110 threadably couples to stud 106 on the opposite side of clamp 54 from spreader arm 40.

Accordingly, as illustrated by FIGS. 1 and 5, tarp 14 is inserted between clamp 54 and spreader arm 40. Tightening of knob 110 causes tarp 14 to become securely clamped between clamp 54 and spreader arm 40. In order to further improve retaining abilities of clamp 54, the surface of clamp 54 which faces tarp 14 and the surface of spreader arm 40 which faces tarp 14 may advantageously be configured as non-slip surfaces. As discussed above in connection with threaded axle 78, outer-most threads of stud 106 may advantageously be disturbed after installation of knob 110 so that knob 110 cannot be easily removed thereafter. Such disturbance prevents knob 110 from being inadvertently removed from stud 106.

In summary, the present invention provides an improved apparatus and method for controlling cable waste materials. Discrete support members 12 and tarp 14 permit the apparatus of the present invention to be easily transported and installed on an aerial cable. Moreover, support members 12 may be positioned at any distance from one another on cable assembly 10, support members 12 may extend in any vertical or horizontal direction from cable assembly 10, the vertical distance of tarp 14 from cable assembly 10 may be adjusted, and the horizontal distance of the edges of tarp 14 from cable assembly 10 may be adjusted. Due to these numerous adjustable factors associated with the present invention, the present invention is readily adaptable to a wide variety of single and multiple cable configurations.

The present invention has been described above with reference to a preferred embodiment. However, those skilled in the art will recognize that changes and modifications may be made in this preferred embodiment without departing from the scope of the present invention. For example, support members 12 may extend vertically upward and support arms 40 and 42 may angle downward. In such a configuration, tarp 14 may be suspended beneath cable assembly 10 and a tool or other weight may be placed in tarp 14 to simulate a "V" shape which will retain waste materials captured therein. These and other changes and modifications which are obvious to those skilled in the art are intended to be included within the scope of the present invention.

What is claimed is:

1. An apparatus for attachment to a cable and for supporting a flexible sheet beneath said cable to catch waste materials from said cable, said apparatus comprising:

a riser having first and second ends and being configured for perpendicular orientation relative to said cable;

first clamping means, coupled to said riser proximate said riser first end, for clamping said riser to said cable;

a first spreader arm having first and second ends and being coupled proximate said first spreader arm first end to said riser at a first coupling point which resides between said riser first and second ends, said first spreader arm extending at an angle in a first direction from said riser;

a second spreader arm having first and second ends and being coupled proximate said second spreader arm first end to said riser at a second coupling point which resides between said riser first and second ends, said second spreader arm extending at an angle in a second direction from said riser, said second direction opposing said first direction;

second clamping means, coupled to said first spreader arm between said first and second ends of said first spreader arm, for releasably holding said flexible sheet; and third clamping means, coupled to said second spreader arm between said first and second ends of said second spreader arm, for releasably holding said flexible sheet.

2. An apparatus as claimed in claim 1 wherein said first clamping means comprises:

a saddle member rigidly attached to and extending generally perpendicularly away from said riser; and strapping means, coupled to said saddle, for lashing said saddle to said cable.

3. An apparatus as claimed in claim 2 wherein said saddle member comprises:

a first plate extending perpendicularly away from said riser; and a second plate extending perpendicularly away from said riser, said second plate residing at an angle to said first plate so that a groove is formed therebetween, said groove serving to position said cable in said saddle.

4. An apparatus as claimed in claim 2 wherein said strapping means comprises:

a flexible strap having a first end, said strap being attached to said saddle proximate said strap first end;

a tensioning device attached to said flexible strap distal to said strap first end; and retaining means, coupled to said saddle, for coupling to said tensioning device and for operating with said tensioning device to clamp said saddle to said cable.

5. An apparatus as claimed in claim 1 wherein:

said riser and said first spreader arm are mutually configured so that the distance between said first end of said riser and said first coupling point is adjustable; and said riser and said second spreader arm are mutually configured so that the distance between said first end of said riser and said second coupling point is adjustable.

6. An apparatus as claimed in claim 5 wherein said riser has an elongated opening extending between said riser first and second ends, and said apparatus additionally comprises an axle protruding through said opening and slidable within said opening, said first and second spreader arms coupling to said axle for adjustable positioning of said first and second coupling points.

7. An apparatus as claimed in claim 6 wherein said axle has threads formed thereon, and said apparatus additionally comprises a knob threadably coupled to said axle to clamp said axle to said riser.

8. An apparatus as claimed in claim 1 wherein:
said riser and said first spreader arm are mutually configured so that said angle in said first direction is adjustable; and
said riser and said second spreader arm are mutually configured so that said angle in said second direction is adjustable.

9. An apparatus as claimed in claim 8 wherein said riser has an opening between said riser first and second ends, and said apparatus additionally comprises an axle protruding through said opening, said first and second spreader arms rotatably coupling to said axle for adjustable positioning of said angles in said first and second directions.

10. An apparatus as claimed in claim 9 wherein said axle has threads formed thereon, and said apparatus additionally comprises a knob threadably coupled to said axle to clamp at least one of said first and second spreader arms in a stationary position.

11. An apparatus as claimed in claim 1 additionally comprising a member located proximate one of said riser second end, said first end of said first spreader arm, and said first end of said second spreader arm, said member extending generally perpendicular to said riser and being configured for substantially parallel orientation relative to said cable, said member being for anchoring said flexible sheet.

12. An apparatus as claimed in claim 1 wherein each of said second and third clamping means comprises:
a bolt rigidly coupled to said spreader arm;
a plate having an opening therethrough, said plate opening for coupling to said bolt, said plate and said spreader arm being mutually configured for placement of said flexible sheet therebetween; and
a knob threadably coupled to said bolt for selectably clamping said plate between said spreader arm and said knob to secure said flexible sheet.

13. An apparatus for attachment to a cable and for catching waste materials from said cable, said apparatus comprising:
a first support member having a riser, a first spreader arm, and a second spreader arm, said first support member being configured for clamping to said cable so that said first support member riser extends away from said cable and so that said first support member first and second spreader arms project away from said riser on opposing sides of said cable;
a second support member having a riser, a first spreader arm, and a second spreader arm, said second support member being configured for clamping to said cable so that said second support member riser extends away from said cable and so that said second support member first and second spreader arms project away from said riser on opposing sides of said cable; and
a flexible sheet coupled to said first and second spreader arms of said first and second support members, said flexible sheet being for positioning beneath said cable so that said waste materials are retained therein.

14. An apparatus as claimed in claimed 13 wherein each of said first and second support members additionally comprises:
first clamping means, coupled to said riser, for clamping said riser to said cable;
second clamping means coupled to said first spreader arm for removably attaching said flexible sheet to said first spreader arm; and
third clamping means coupled to said second spreader arm for removably attaching said flexible sheet to said second spreader arm.

15. An apparatus a claimed in claim 14 wherein said means for clamping comprises:
a saddle member rigidly attached to and extending away from said riser; and
strapping means, coupled to said saddle, for lashing said saddle to said cable.

16. An apparatus as claimed in claim 15 wherein said saddle member comprises:
a first plate generally extending perpendicularly away from said riser; and
a second plate generally extending perpendicularly away from said riser, said second plate residing at an angle to said first plate so that a groove is formed therebetween, said groove serving to position said cable in said saddle.

17. An apparatus as claimed in claim 15 wherein said strapping means comprises:
a flexible strap having a first end, said strap being attached to said saddle proximate to said strap first end;
a tensioning device attached to said flexible strap distal to said strap first end; and
retaining means, coupled to said saddle, for coupling to said tensioning device and for operating with said tensioning device to clamp said saddle to said cable.

18. An apparatus as claimed in claim 13 wherein, for each of said first and second support members:
said riser has a first end positionable adjacent to said cable;
said riser and said first spreader arm are mutually configured so that said first spreader arm couples to said riser at a first coupling point, wherein a distance between said first end of said riser and said first coupling point is adjustable; and
said riser and said second spreader arm are mutually configured so that said second spreader arm couples to said riser at a second coupling point, wherein a distance between said first end of said riser and said second coupling point is adjustable.

19. An apparatus as claimed in claim 18 wherein said riser has an elongated opening extending away from said riser first end, and each of said first and second support members additionally comprises an axle protruding through said opening and slidable within said opening, said first and second spreader arms coupling to said axle for adjustable positioning of said first and second coupling points.

20. An apparatus as claimed in claim 19 wherein said axle has threads formed thereon, and each of said first and second support members additionally comprises a knob threadably coupled to said axle to clamp said axle to said riser.

21. An apparatus as claimed in claim 13 wherein, for each of said first and second support members:
said riser and said first spreader arm are mutually configured so that an angle between said riser and said first spreader arm on a first one of said opposing sides of said cable is adjustable; and said riser and said second spreader arm are mutually configured so that an angle between said riser and said second spreader arm on a second on of said opposing sides of said cable is adjustable.

22. An apparatus as claimed in claim 21 wherein said riser has an opening therein, and said each of said first and second support members additionally comprises an axle protruding through said opening, said first and second spreader arms rotatably coupling to said axle for adjustable positioning or said angles on said first and second opposing sides of said cable.

23. An apparatus as claimed in claim 22 wherein said axle has threads formed thereon, and said apparatus additionally comprises a knob threadably coupled to said axle to clamp at least one of said first and second spreader arms in a stationary position.

24. An apparatus as claimed in claim 13 wherein:
said first support member additionally comprises a projecting member extending away from said riser in a direction generally perpendicular to said first support member first and second spreader arms;
said second support member additionally comprises a projecting member extending away from said riser in a direction generally perpendicular to said second support member first and second spreader arms; and
said first and second support member projecting members are configured to face one another and to be positioned above said flexible sheet so that said projecting members cooperate to anchor said flexible sheet.

25. An apparatus for catching and retaining waste materials from cable splicing operations, said apparatus comprising:
a cable and having said waste materials associated therewith at a splice area thereof;
a first support member having a riser, a first spreader arm, and a second spreader arm, said first support member being clamped to said cable on a first side of said splice area so that said first support member riser extends away from said cable and so that said first support member first and second spreader arms project away from said riser on opposing sides of said cable;
a second support member having a riser, a first spreader arm, and a second spreader arm, said second support member being clamped to said cable on a second side of said splice area so that said second support member riser extends away from said cable and so that said second support member first and second spreader arms project away from said riser on opposing sides of said cable; and
a flexible sheet coupled to said first and second spreader arms of said first and second support members, said flexible sheet being positioned beneath said splice area of said cable so that said waste materials are caught and retained therein.

26. An apparatus as claimed in claimed 25 wherein each of said first and second support members additionally comprises:
first clamping means, coupled to said riser, for clamping said riser to said cable;
second clamping means coupled to said first spreader arm for removably attaching said flexible sheet to said first spreader arm; and
third clamping means coupled to said second spreader arm for removably attaching said flexible sheet to said second spreader arm.

27. An apparatus as claimed in claim 25 wherein, for each of said first and second support members:
said riser and said first spreader arm are mutually configured so that said first spreader arm couples to said riser at a first coupling point, wherein a distance between said cable and said first coupling point is adjustable; and
said riser and said second spreader arm are mutually configured so that said second spreader arm couples to said riser at a second coupling point, wherein a distance between said cable and said second coupling point is adjustable.

28. An apparatus as claimed in claim 25 wherein, for each of said first and second support members:
said riser and said first spreader arm are mutually configured so that an angle between said riser and said first spreader arm on a first one of said opposing sides of said cable is adjustable; and
said riser and said second spreader arm are mutually configured so that an angle between said riser and said second spreader arm on a second one of said opposing sides of said cable is adjustable.

29. An apparatus as claimed in claim 13 wherein:
said first support member additionally comprises a projecting member extending away from said riser in a direction generally perpendicular to said first support member first and second spreader arms;
said second support member additionally comprises a projecting member extending away from said riser in a direction generally perpendicular to said second support member first and second spreader arms; and
said first and second support member projecting members face one another and are positioned above said flexible sheet so that said projecting members cooperate to anchor said flexible sheet beneath said cable splice area.

30. A method of controlling waste materials produced during splicing operations at a slice area of a suspended cable, said method comprising the steps of:
clamping a first support member to said cable on a first side of said splice area, said first support member having a riser extending away from said cable and at least one spreader arm coupled to and extending at an angle away from said riser;
clamping a second support member to said cable on a second side of said splice area, said second support member having a riser extending away from said cable and at least one spreader arm coupled to and extending at an angle away from said riser, and
attaching a flexible sheet to said at least one spreader arm of said first and second support members so that said flexible sheet is positioned beneath said cable splice area to catch and retain waste materials therein.

31. A method of controlling waste materials as claimed in claim 30 wherein each of said clamping a first support member and said clamping a second support member steps comprises the steps of:
lashing said support member to said cable with a lashing device; and
adjusting tension or said lashing device so that said support member is immovably retained adjacent to said cable.

32. A method of controlling waste materials as claimed in claim 30 additionally comprising the steps of:

adjusting the distance from said cable at which said spreader arm of said first support member couples to said first support member riser; and adjusting the distance from said cable at which said spreader arm of said second support member couples to said second support member riser, said adjusting steps operating to vertically position said flexible sheet beneath said cable.

33. A method of controlling waste materials as claimed in claim 30 additionally comprising the steps of:

adjusting the angle at which said spreader arm of said first support member extends away from said first support member riser; and adjusting the angle at which said spreader arm of said second support member extends away from said second support member riser, said adjusting steps operating to space edges of said flexible sheet horizontally away from said cable.

34. A method of controlling waste materials as claimed in claim 30 additionally comprising the steps of:

positioning said risers of said first and second support members beneath said cable; and routing said flexible sheet beneath a projecting member located on each of said support members, said projecting members of said support members extending away from said risers of said support members and facing one another, said routing step operating to anchor said flexible sheet.

* * * * *